(12) United States Patent
Jones

(10) Patent No.: US 6,522,727 B1
(45) Date of Patent: Feb. 18, 2003

(54) SYSTEM FOR ARCHIVING VOICE MAIL MESSAGES

(75) Inventor: Scott A. Jones, Prides Crossing, MA (US)

(73) Assignee: Comverse, Inc., Wakefield, MA (US)

( * ) Notice: Subject to any disclaimer, the term of this patent is extended or adjusted under 35 U.S.C. 154(b) by 0 days.

(21) Appl. No.: 08/992,341

(22) Filed: Dec. 17, 1997

Related U.S. Application Data

(63) Continuation of application No. 08/400,758, filed on Mar. 8, 1995, now abandoned.

(51) Int. Cl.[7] .............................................. H04M 11/00
(52) U.S. Cl. ................................. 379/88.23; 379/88.18
(58) Field of Search ........................... 379/88.17, 88.18, 379/88.22, 88.23, 88.24, 88.27, 84, 101, 75; 395/488, 489

(56) References Cited

U.S. PATENT DOCUMENTS

| | | | |
|---|---|---|---|
| 3,728,948 A | 4/1973 | Kraus ......................... 179/2 R |
| 4,371,752 A | 2/1983 | Matthews et al. ............. 179/18 |
| 4,580,012 A | 4/1986 | Matthews et al. ............. 179/18 |
| 4,581,486 A | 4/1986 | Matthews et al. ............. 179/18 |
| 4,585,906 A | 4/1986 | Matthews et al. ............. 179/18 |
| 4,602,129 A | 7/1986 | Matthews et al. ............. 179/18 |
| 4,790,003 A | 12/1988 | Kepley et al. ............... 379/142 |
| 4,972,461 A | 11/1990 | Brown et al. ................. 379/67 |
| 4,985,914 A | 1/1991 | Fukunaga .................... 379/88 |
| 5,020,090 A | 5/1991 | Morris ........................ 379/56 |
| 5,029,199 A | 7/1991 | Jones et al. |
| 5,133,004 A | 7/1992 | Heileman, Jr. et al. ....... 379/67 |
| 5,172,404 A | 12/1992 | Hashimoto .................... 379/67 |
| 5,191,613 A | 3/1993 | Graziano et al. ............. 388/25 |
| 5,193,110 A | 3/1993 | Jones et al. |
| 5,274,696 A | 12/1993 | Perelman ..................... 379/89 |
| 5,373,550 A | 12/1994 | Campbell et al. ........... 379/100 |

FOREIGN PATENT DOCUMENTS

WO    WO95/03661    2/1995

OTHER PUBLICATIONS

Computing Accessories–Storage Options, p., 93.
Latest Available Products CD–ROM Products, "Ricoh CD–ROM Recording/Player", p. E (advertisement).
Complete CD Recorder Solutions (advertisement).
Are You Getting The Whole Story? (advertisement).
Personal Computing Tools, Computing Accessories Storage Options (advertisement).
Repartee Telanophy Feature Package Guide, Active Voice Corporation, Mar. 1994.
BYTE, Jan. 1995, Circle 289 on Inquiry Card (Resellers: 290), 1994 BYTE Awards, p. 60 (advertisement).

Primary Examiner—Fan Tsang
Assistant Examiner—Roland G. Foster
(74) Attorney, Agent, or Firm—Staas & Halsey LLP

(57) ABSTRACT

An archival system for voice mail messages includes recording devices, such as cassette recorders, compact disc recorders and DAT recorders. The archival system may be directly connected to one or more voice mail systems, or connectable via the public switched telephone network, so that the archival system can serve several voice mail systems. Voice mail messages identified by users to be archived are stored in a transfer queue in a voice mail system. The voice mail system performs an outdialing operation to connect to the archival system and transmits the voice mail messages, together with message identifying information, such as preferred storage medium and an optional header identifying the message, to a storage queue in the archival system. The archival system instructs an operator to mount a tape or other storage medium in a selected device and then records the voice mail messages on a removable storage medium.

57 Claims, 5 Drawing Sheets

SYSTEM FOR ARCHIVING VOICE MAIL MESSAGES

CROSS-REFERENCES TO RELATED APPLICATIONS

This application is a continuation of U.S. application Ser. No. 08/400,758, filed on Mar. 08, 1995, abandoned on Dec. 18, 1997.

BACKGROUND OF THE INVENTION

1. Field of the Invention

The present invention is directed to storage of voice mail messages and, more particularly, to the transfer of voice mail messages from conventional storage to removable media, such as cassette tapes, compact discs, mini-discs, or any other conventional medium to be used with readily-available consumer audio equipment.

2. Description of the Related Art

There are a number of telephone communication systems available offering information services to users. Many of these systems store and forward voice mail messages. Examples of such systems are disclosed in U.S. Pat. Nos. 4,371,752; 4,580,012; 4,581,486; 4,585,906; and 4,602,129, all assigned to VMX, Inc. (U.S. Pat. No. 4,371,752 was originally assigned to ECS Telecommunications, Inc.). Other systems are described in U.S. Pat. Nos. 5,029,199 and 5,193,110 both of which are assigned to Boston Technology, Inc. and are incorporated herein by reference. These systems are connected to a central office of a local telephone company or to a private branch exchange or other system handling calls for a large number of telephones. When one of the telephones serviced by the central office or other system is not answered, the calling party is given an opportunity to leave a telephone message which is stored for later reproduction by the user of the called telephone, i.e., the voice message mailbox owner.

A user of a typical voice mail system has several options in handling voice mail messages. After a message has been retrieved, the message may be deleted, saved or forwarded to another mailbox. A user may wish to save important messages for a long period of time. However, saving voice mail messages in a mailbox for a long period of time is inefficient. Every time a user requests a list of messages in the mailbox, older messages will be listed, even though the user will usually only be interested in recent messages. One way of avoiding this situation on existing systems would be to set up one or more voice message mailboxes for the purpose of storing archive messages. Drawbacks to this solution include the chance of losing data over a long period of time; monopolization of system resources; limiting the amount of memory available for new messages; limiting reproduction of the messages to telephones; increasing the cost of storage; and decreasing overall system efficiency.

SUMMARY OF THE INVENTION

An object of the present invention is to provide copies of voice mail messages on removable media, so that the messages may be played back on equipment other than the type of voice mail equipment on which they were recorded.

Another object of the present invention is to provide a system for archiving voice mail messages for multiple voice mail systems.

Yet another object of the present invention is to provide a voice mail archival system which permits users to select a specific medium from a plurality of media for storage of a voice mail message, where each of the media may have different cost and performance characteristics.

The above objects are attained by providing a method of producing archival recordings of voice mail messages, comprising the steps of: retrieving a voice mail message; transferring the voice mail message to a recording device; and recording the voice mail message on a removable storage medium. In the preferred embodiment, information on how the voice mail message should be recorded is obtained either directly from the user or from a previously stored profile created by the user. The removable storage medium is preferably accessed by the separate archival system, connected via telecommunication lines with one or more voice mail systems. Additionally, the archival system itself may be capable of performing voice mail operations as well as archival operations.

A user identifies one or more voice mail messages to be archived and the message(s) are entered in a queue for transfer from the voice mail system to the archival system. At a predetermined point in time, such as in the middle of the night during low usage of the voice mail system, the voice mail messages are transferred to a queue on the archival system. Subsequently, the archival system instructs the mounting of appropriate storage media for recording of the voice mail messages. The voice mail system receives confirmation of successful transfer of the voice mail messages to the archival system and also receives an indication of successful recording of the voice mail messages. The messages stored on the voice mail system may be either automatically deleted in response to either of these indications, or deletion of the original voice mail messages may be left in the hands of the users, with or without receipt of either of these indications.

In an alternative embodiment of the invention, the archival system is connected to one or more voice mail systems, and the archival system automatically queries the voice mail systems periodically to delete or reproduce messages. According to the alternative embodiment, preferably, all of a user's messages stored at the voice mail system may be reproduced or deleted automatically by the archival system. However, if the archival system has voice recognition capabilities, the archival system may selectively delete or reproduce messages based upon predefined criteria, such as age of messages, whereby the predefined criteria are recognized by listening to a message using the voice recognition capabilities. In accordance with the alternative embodiment, the archival system may efficiently create a record on a removable storage medium for each user on, e.g., a monthly, quarterly, or yearly basis.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

An archival system according to the present invention may be directly connected to and share components with a conventional voice mail system. However, in the preferred embodiment, the archival system is able to receive voice mail messages via the public switched telephone network (PSTN) from a plurality of voice mail systems. An example of a conventional voice mail system which may supply voice mail messages to the preferred embodiment of an archival system, or provide a platform for archival operations is illustrated in FIG. 1.

Figure 1:
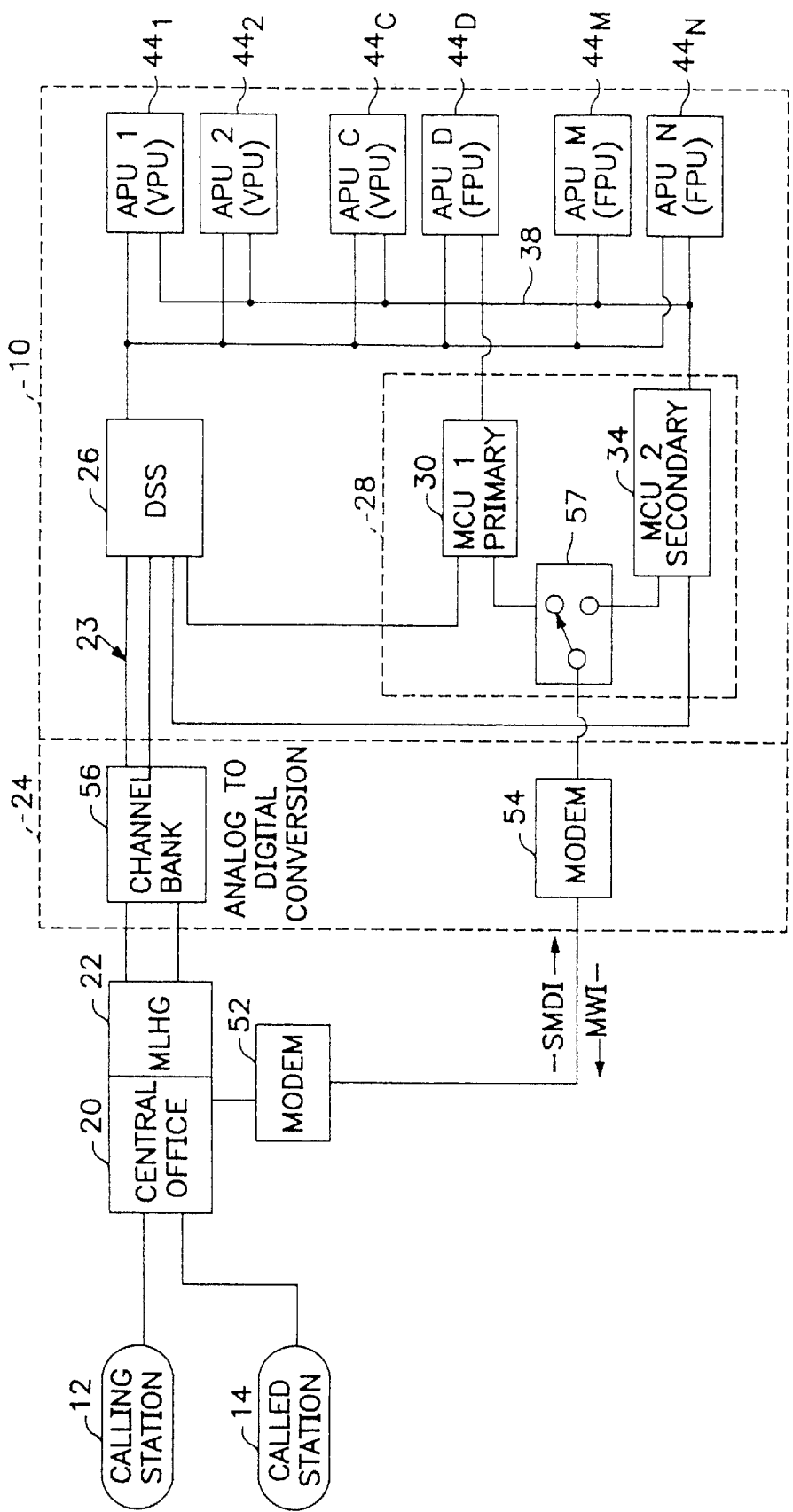
FIG. 1 is a block diagram of an integrated services platform providing voice mail messaging capability.

The integrated services platform 10 illustrated in FIG. 1 will be briefly described so that the entire process of archiving voice mail messages may be understood from the creation of a voice mail message itself. Many of the services provided by the integrated services platform 10 are related to messages transmitted between a calling station 12 and a called station 14. These stations may be standard voice-only telephones, facsimile machines, or other telecommunication devices. The stations 12, 14 are connected via a conventional switch, such as a central office 20 of the public switched telephone network (PSTN), a private branch exchange (PBX) or other switch. If the central office 20 is a modern digital switch, it can be directly connected to the integrated services platform 10 via one or more sets of multi-line hunt groups (MLHG) 22 and T-1 lines 23. However, if the platform 10 is connected to an older analog central office 20, an analog-to-digital conversion unit 24 must be provided to connect the MLHG 22 to a digital switching system (DSS) 26 in the platform 10. The digital switching system 26 operates under the control of a control unit 28 formed by one or more computers, 30, 34 which perform the functions of a master control unit MCU for the platform 10. The MCUs 30, 34 communicate with the digital switching system 26 via a line 36 to control switching operations performed by the digital switching system 26.

Figure 2:
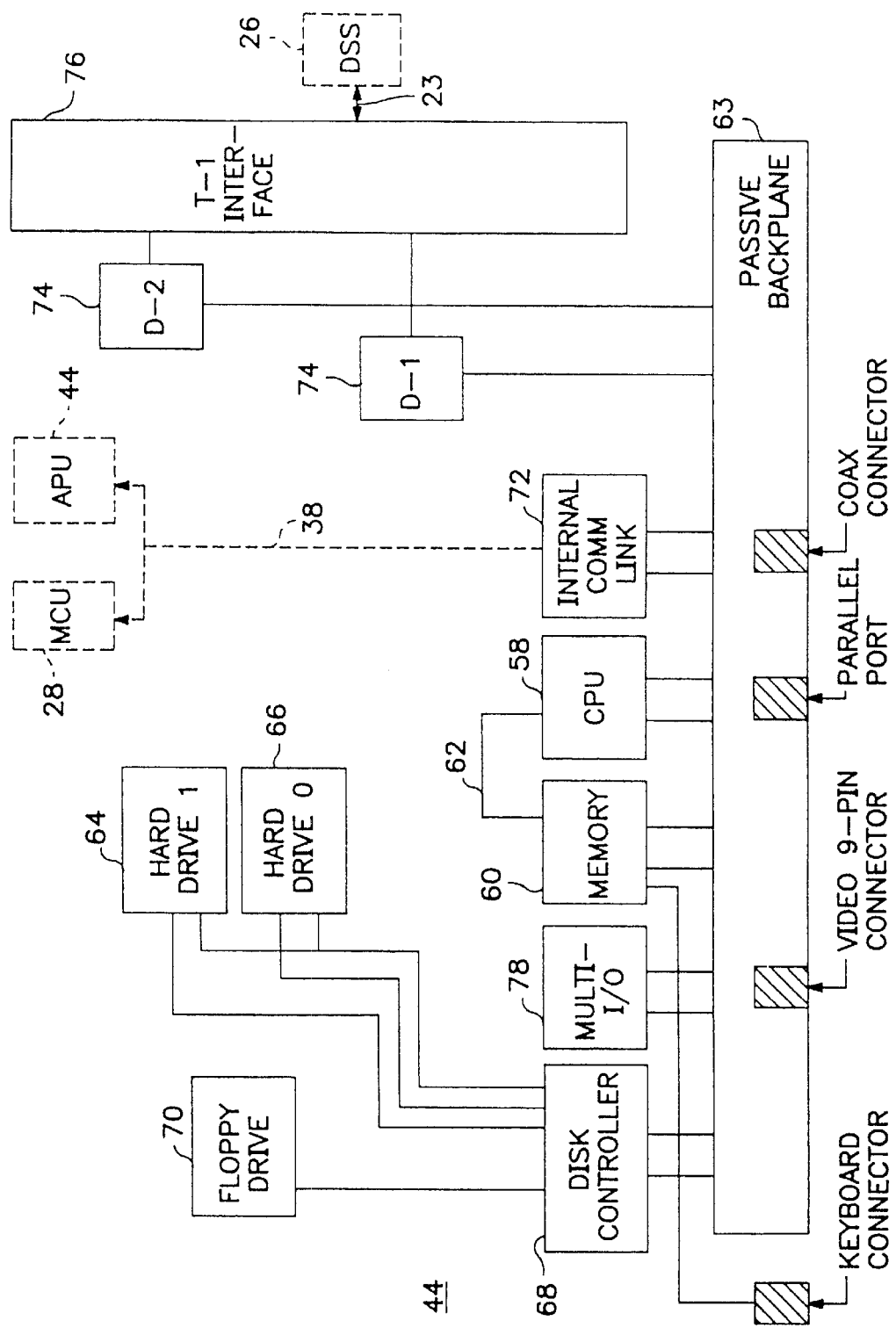
FIG. 2 is a block diagram of an application processing unit in the integrated services platform illustrated in FIG. 1.

The MCUs 30, 34 communicate via an internal bus 38 to application processing units (APUs) 44 which execute service programs to provide the information services of the platform 10. As described in U.S. Pat. No. 5,193,110, the application processing units 44 may perform many functions, including speech recognition and speech synthesis, voice mail processing, facsimile processing, electronic-mail processing, video text processing, etc. As illustrated in FIG. 2 and described in U.S. Pat. No. 5,193, 110, some of the application processing units (APUs) 44 may be limited to providing a single service, such as voice processing units $44_2$–$44_C$ or facsimile processing units $44_D$–$44_M$. Other application processing units represented by APUs $44_i$ and $44_N$ may provide multiple services which are either used less often or provide, e.g., voice mail and facsimile processing for responding to fluctuation in demand.

During operation, the primary MCU 30 receives a message packet using a protocol such as the simplified message desk interface (SMDI) via modem 52 connected to the central, office 20 and modem 54 in the analog-to-digital conversion unit 24. The same link can be used to send a message waiting indication (MWI) through the central office 20 to the called station 14 if such signals are supported. The message packet indicates that a link has been established between the central office 20 and the digital switching system (DSS) 26 via the MLHG 22. If the central office 20 is an analog switch, a channel bank 56 in the analog-to-digital conversion unit 24 is used to establish communication between the central office 20 and the digital switching system 26. The primary MCU 30 communicates with the central office 20 via modems 52 and 54 as indicated by switch 57. A physical switch 57 may not be present in the platform 10, but is illustrated to indicate that when more than one MCU processor is provided, only the primary MCU, e.g., MCU 30, communicates with the central office 20. The message packet received by the primary MCU 30 includes, e.g., a message desk identification number, a trunk number indicating which port of the digital switching system 26 will receive the call and the phone numbers of the calling and called stations 12, 14. In response to receipt of the message packet, the MCU 30 controls the digital switching system 26 to route the call to an application processing unit (APU) 44 capable of performing initial call processing and having an available port to receive the call. The selected APU 44 receives information based on the SMDI packet from the primary MCU 30 via the internal bus 38 and the call from the DSS 26 via the port selected by the MCU 30.

An example of an application processing unit 44 is illustrated in FIG. 2. A CPU 58, such as an INTEL 80386, is connected to a memory 60 via a conventional thirty-two channel bus 62. Connections to other devices within an APU 44 are provided by a passive backplane 63. These devices include hard drives 64, 66 connected to a disk controller 68 which also controls a floppy drive 70. An internal communication link 72, such as ETHERNET communication link, connects the APU 44 to other processors in the platform 10, such as the MCUs 30, 34 in the control unit 28 and the other APUs 44. Digital ports 74 connect the passive backplane 63 to the digital switching system 26 via a telephone communication standard T-1 interface 76. Other input and output may be provided by multi-I/O unit 78. All of the components in the APU 44 may be conventional, as disclosed in U.S. Pat. No. 5,193,110.

When the calling station 12 leaves a voice mail message for the called station 14, the APU 44 handling the call stores the message contents on one of the hard drives 64, 66. If the present invention is implemented using the platform illustrated in FIG. 1, a commercially available program for storing audio messages on floppy disks could be used in conjunction with floppy drive 70 to record the voice mail messages. Alternatively, another interface card, such as the multi-I/O card 78, which supports connection to other types of devices, such as cassette tapes, may be used. In this embodiment of the present invention, the process of archiving voice mail messages is considerably simpler than that of the preferred embodiment described below. The most important requirements are following proper procedures to ensure that a storage medium, such as a cassette tape, on which a voice mail message is to be recorded, successfully records the voice mail message and is properly identified as belonging to the user requesting that the message be archived. Methods for accomplishing these tasks will be apparent to one of ordinary skill in the art in the description of how these tasks are accomplished in the preferred embodiment.

Figure 3:
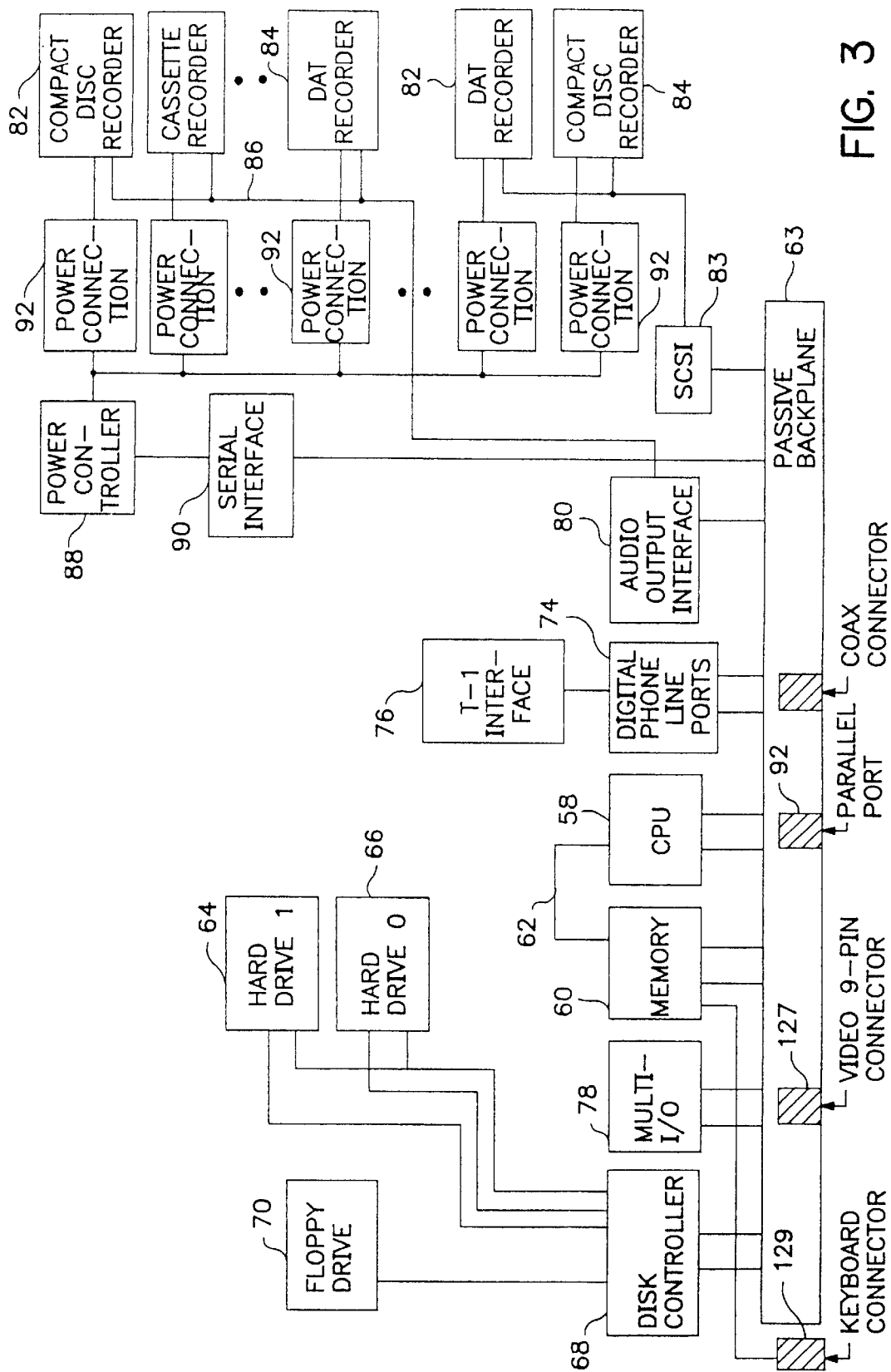
FIG. 3 is a block diagram of an archival system for recording voice mail messages on removable storage media.

In the preferred embodiment of the present invention an archival system separate from a voice mail system where a message is recorded is provided as illustrated in FIG. 3. While a platform like that illustrated in FIG. 1 could be used for a stand-alone archival system, unless a very large number of voice mail systems are being serviced by the archival system, the archival system may be much simpler. As illustrated in FIG. 3, in the preferred embodiment a modified application processing unit is directly connected via phone line ports 74 and T-1 interface 76 to the public switched telephone network. Depending upon the number of voice mail messaging systems serviced by the archival system, the phone line ports 74 may be provided by a single multiport telephone system interface card, such as a four port DIA-LOGIC Model No. D41B or a 12-port DIALOGIC Model No. D121, or two or more of such cards. If necessary, additional systems like that illustrated in FIG. 3 may be provided with one or more cards providing phone line ports 74.

As illustrated in FIG. 3, components for recording voice mail messages are added to a system like an APU 44 to provide an archival system according to the preferred embodiment. An audio output interface 80, such as a DIA-LOGIC AMX-80 card, is connected to recording devices, such as a conventional cassette recorder, a compact disc recording unit 82, such as a CD-Rom Recording System, Model No. H90300211 manufactured by Phillips, and a DAT recorder 84, such as the SHUTTLE® DAT recorder available from Computer Connections USA. However, the present invention is not limited to the compact disc recorder and DAT recorder described above and various other types of conventional compact disc and DAT recording devices may be used with the present invention. As indicated by the ellipses, more than one such recorder may be connected to the audio output interface 80 via an audio bus 86. Furthermore, digital storage devices, such as the compact disc recorder 82 and the DAT recorder 84 may be attached to the voice mail system 10 not only by audio connections to the audio output interface 80, but also via a digital small computer system interface (SCSI) port 83 connected directly to the storage device. Accordingly, the data from the voice mail system 10 remains digital when it is transferred to the storage device. It is well known in the art how to translate the format that the voice mail system 10 uses to store voice data to the format required for the compact disc recorder 82 and DAT recorder 84 to store data. In addition, other types of recording devices, such as open-reel tapes and mini disc recorders, could be made available to subscribers of the archival system's services. In general, archived messages may be recorded on removable storage media such as cassette tapes, compact discs, DAT, mini-discs or any other conventional medium used with readily-available consumer audio equipment.

The above-described components are sufficient to provide an archival system. However, it is desirable to provide as many controls as possible to ensure that voice mail messages are recorded on the correct removable storage medium. In the preferred embodiment, a power controller 88, such as a CP-100 available from Radio Shack, is connected via a serial interface 90 to the passive backplane 63 to control the supply of power to the recording devices 82, 84. The power controller 88 supplies power only to specified recording devices via power connections 92 as described below.

A "juke-box" apparatus or robot device (not shown) may be used to mount the removable storage medium. Preferably, labels are printed on a printer (not shown) connected to, e.g., the parallel port 92 to identify the removable storage medium. These labels may be applied to the removable storage medium manually or using the robotic device mentioned above.

Figures 4A, 4B:
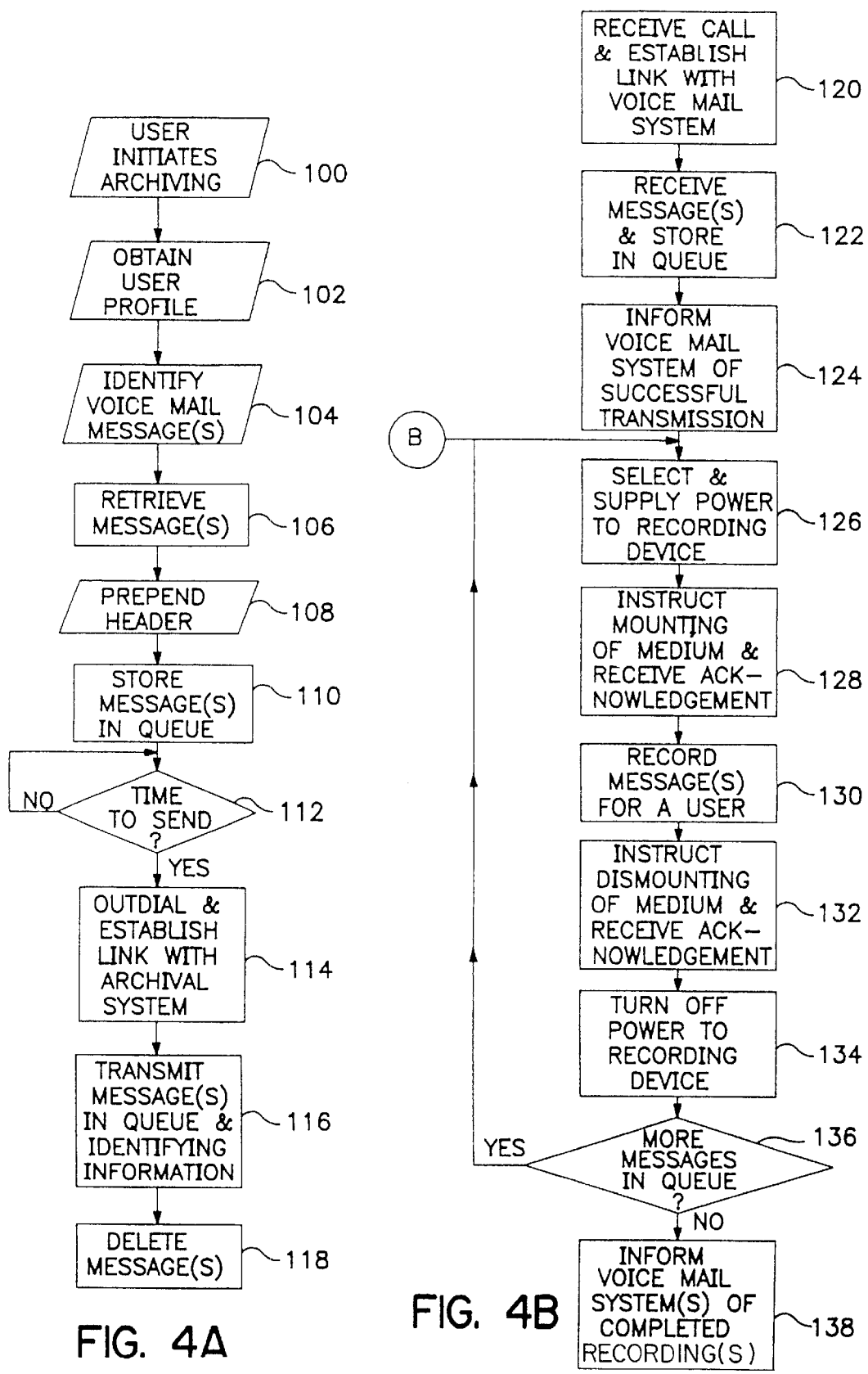
FIG. 4A is a flow chart of steps performed by a voice mail system to archive voice mail messages.
FIG. 4B is a flow chart of steps performed by an archival system.

A flow chart for the process of transferring voice mail messages from their storage location on one of the hard drives 64, 66 in one of the APUs 44 of the voice mail system 10 to one of the recording devices 82, 84 is illustrated in FIGS. 4A and 4B. In the preferred embodiment, all archiving is initiated 100 by users either directly or indirectly through a user-configured schedule of archiving. It is also possible to have the voice mail system automatically archive very old messages, e.g., over one year old, but this is not done in the preferred embodiment. Typically, archiving will be initiated when a user responds to an audio menu by depressing one of the keys on a conventional 12-key telephone keypad to indicate an archive option. When the voice mail system 10 receives a request for archiving from a user, information on how the archive operation should be performed must be obtained. Archive options may be set up by the system administrator, or optionally, the user may configure these options using voice menus. In the preferred embodiment, a user profile is stored by the voice mail system 10. The user profile may contain information such as a preferred storage medium, a preferred archival system if more than one is available, when and if the original voice mail message should be deleted, etc. The voice mail system obtains 102 the profile for a user who requests archiving of voice mail messages. If a user profile is not stored for the user, the user is prompted for the information required to archive messages, including selection of a removable storage medium.

An example of a data structure for the user profile may include entries as shown below in the Tables, where Table 1 shows an example of a data structure for user information and Table 2 shows an example of a data structure for archival system information.

TABLE 1

| Data Structure | Description |
| --- | --- |
| user_name | full name of subscriber |
| user_address | address where archive medium may be delivered via mail or otherwise |
| user_phone_number | phone number where user may be contacted if there are any problems |

The above three fields will be printed on the label of the archive medium along with a directory of the messages which are archived on the medium.

TABLE 2

| Data Structure | Description |
| --- | --- |
| archival_method | The type of archival. Values may include: AGED_ARCHIVING, HI_WATER_MARK_ARCHIVING (when capacity of mailbox exceeds a certain level) USER_MARKED_ARCHIVING, ALL_MESSAGE_ARCHIVING |
| age_of_messages_to_be archived | The age of the messages which the subscriber wants archived. (Valid when archival method is AGED_ARCHIVING) |
| hi_water_mark_count | The count of messages which triggers archiving. |
| preferred_storage_medium | One of a distinct set of media types including cassette tapes, CD, DAT cassette, etc . . . values may include: CASSETTE_TAPE, COMPACT_DISC, DIGITAL_AUDIO_TAPE_CASSETTE, 8_TRACK_TAPE, MINI_COMPACT DISC, |

TABLE 2-continued

| Data Structure | Description |
| --- | --- |
| | MINI_CASSETTE_TAPE, VIDEOTAPE. |
| secondary_storage_medium | Similar to preferred_storage_medium. |
| preferred_archival_system | Pointer to a method of reaching and communicating with the archival system of choice. May be a service offered by a separate business entity other than the voice mail service provider. |

In addition to obtaining 102 the information contained in the user profile, it is necessary for the user to identify 104 one or more voice mail messages to be archived. This may be accomplished in several ways. After listening to a message, a user may be given an option of storing the message for archiving. In this case, selection of this option would both initiate 100 archiving and identify 104 the voice mail message for archiving. Alternatively, messages can be marked for archival when each message is retrieved (not necessarily the first time it is retrieved). When an archive command is initiated by the subscriber, the messages marked for archival are then archived. Alternatively, when the archive option is presented on a menu, the user may be given a list of voice mail messages in, the user's mailbox and messages to be archived can be identified in the same way that messages are selected for retrieval/playback.

After message(s) have been identified 104 by any. method, the voice mail system 10 retrieves 106 the message (s) for transfer to the archival system. The transfer to the archival system may be digital or analog. At this time, or at the time that a voice mail message is identified 104, the user may be given an opportunity to prepend 108 a header, i.e., add a short description of the message to be stored with the message when it is archived. The voice mail system 10 stores 110 each of the messages as they are retrieved, together with any header that has been prepended and message identification information, including the preferred storage medium and archival system (if there is more than one archival system used by the voice mail system) in a transfer queue. Steps 100 through 110 may be repeated several times for different users before the voice mail system 10 determines 112 that the voice mail messages in the transfer queue should be sent to the archival system. This determination 112 typically will be made at a particular time of day, such as late at night when there is little use of the voice mail system 10. Additional factors which could be considered include the number of voice mail messages in the transfer queue, etc.

When the voice mail system 10 determines 112 that the message(s) in the transfer queue should be transmitted to the archival system, the MCU 30 initiates an outdialing operation 114 by one of the APUs 44. This is a conventional process for voice mail systems using, e.g., a DIALOGIC D41 or D121 card and software provided by DIALOGIC. When the outdialing operation is successful, a communication link will be established 114 with the archival system. The voice mail system 10 then transmits 116 the message(s) and identifying information including user information in the transfer queue which are directed to the archival system connected by the outdialing operation 114. If more than one archival system is used and the transfer queue contains messages for more than one system, steps 114 and 116 will be repeated.

There are several points in time when the messages to be archived may be deleted 118 from the original storage location on the APUs 44. Table 3 below illustrates an example of a data structure for handling deletion of archived messages.

TABLE 3

| Data Structure | Description |
| --- | --- |
| deletion_handling_method | Specifies the method to be used for deleting messages from the subscriber's voice mail box when archiving has been chosen. Values include: |
| 1. DELETE_IMMEDIATELY | The message is put into a queue on the voice mail machine to be transferred to the archive machine, but the user no longer has a copy of the message in the voice mail box. |
| 2. DELETE_AFTER_TRANSFER | The message is deleted immediately after confirmation that the message has been successfully transferred to the archive system. |
| 3. DELETE_AFTER_REPRODUCTION | The message is deleted immediately after confirmed reproduction of the message on an archival medium. |
| 4. DELETE_UPON_USER_RECEIPT | The message is deleted only after the user has received the reproduction on the archival medium and confirms the receipt. |
| 5. DELETE_DISABLED | Do not trigger deletion based on archival. The user can delete the message normally when he/she chooses. |

The earliest possible time that the voice mail message retrieved 106 from its original storage location may be deleted is when the voice mail message is stored 110 in the transfer queue. If the transfer queue has a backup, this may be acceptable. However some users may want to keep some voice mail messages at least until they have physical possession of the removable storage medium containing a reproduction of the voice mail message. Other possible points in time when the voice mail message may be deleted 118 will be discussed below with respect to FIG. 4B.

The steps performed by an archival system are illustrated in FIG. 4B. The archiving process on the archival system begins when a call is received and a connection is established 120 with a voice mail system. Using a conventional protocol for transfer of data, message(s) are received 122 and stored in a storage queue in the archival system. During digital transfers, to ensure accurate receipt-of the data, a conventional checksum or other error correction method is used. Another method for ensuring integrity of the message in an analog transfer process is to send the length of the message (in seconds or bytes) via DTMF codes. The receiving archival system can ensure that it has received audio energy for an amount of time corresponding to the length of the message. The process of receiving 122 messages includes requesting retransmission of messages received in error. After all of the messages have been accurately received, the archival system informs 124 the voice mail system of successful transmission. At this time, the voice mail messages may be deleted from the archive queue in the voice mail system 10 and if the user has so indicated, the original voice mail messages retrieved in step 106 may also be deleted 118.

The archival system takes the first message in the storage queue and selects 126 a recording device in dependence upon the message identifying information corresponding thereto. The selected recording device is supplied with power by the power controller 88 and one of the power connections 92 (FIG. 3). An operator is instructed 128 via a CRT or other display device (not shown) connected to the video connector 127, to mount a tape or other medium in the selected device. Alternatively, the tape or other medium may also be mounted automatically by an automated device such as a "juke-box" apparatus or a robotic device. When the tape or other medium has been mounted, the operator or automated device provides acknowledgement which is received 128, e.g., via the keyboard connector 129. Upon receiving 128 acknowledgement, one or more messages in the storage queue, requested by the same user to be stored on the same removable storage medium, are recorded 130. After all of the message(s) for a user have been recorded 130, the operator or automated device is instructed 132 to dismount the tape or other medium and apply a label identifying the user. When the archival system receives 132 acknowledgement that the tape has been dismounted, power to the recording device is turned off 134. If it is determined 136 that there are more messages in the storage queue, the process in steps 126–134 is repeated for another recording device requested by a user.

In one alternative embodiment of the present invention, the archival system informs 138 the voice mail system 10 upon completion of recording. This may occur only after the recording of messages has been verified, e.g., using a checksum as the message is recorded, or by having the operator play back the messages. The archival system may inform the voice mail system using an outdialing operation, similar to that performed by the voice mail system 10 in step 114. Upon receiving an indication from the archival system that a voice mail message has been successfully recorded, the voice mail system 10 would delete 118 all messages for users who indicated that the original message should be deleted in response to such an indication.

In another alternative embodiment of the present invention, the archival system is connected to one or more voice mail systems and the archival system automatically initiates and performs archiving at predetermined times to periodically delete or reproduce messages. If the archival system has voice recognition capabilities, the archival system may selectively delete or reproduce messages based on predefined criteria, such as age of message, identity of user, number of messages or size of messages. The archival system detects each of these predefined criteria by listening to voice mail system prompts related to a user's message(s) using the voice recognition capabilities. However, it is preferable to reproduce or delete all of a user's messages stored at the voice mail service system lo during an archiving operation. In this embodiment, a user profile, similar to the one described above in the preferred embodiment, is stored at the archival system to facilitate the archiving process. The user need not be directly involved in the archiving process; however, the user may be directly involved, if desired. Additionally, the voice mail system need not store any user information related to archiving and the archiving may be performed using conventional operation of the voice mail service system 10.

Figure 5:
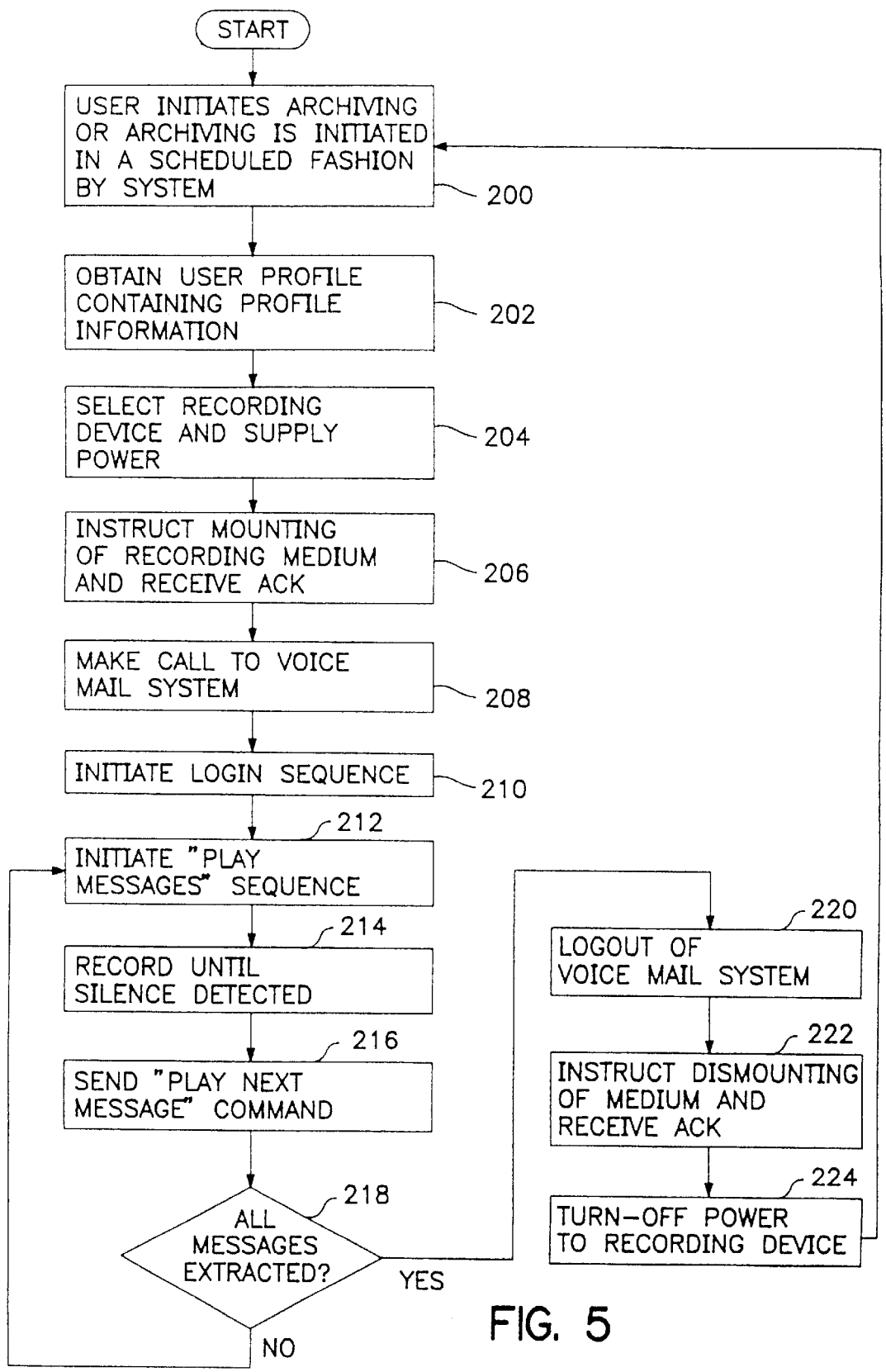
FIG. 5 is a flow chart of steps performed by an archival system to automatically query voice mail system to perform archiving of voice mail messages.

A flow chart showing a process for archival system controlled transfer of voice mail messages from their storage location, and reproduction of the voice mail messages at the archival system is shown in FIG. 5. In contrast to the preferred embodiment, a user need not request archiving, instead, the archiving is automatically requested by the archival system. However, the user may request archiving by calling the archival system directly or by calling the archival system operator. Archiving is initiated by the user or automatically initiated 200 by the archival system in a scheduled fashion at predetermined intervals through a user-configured schedule of archiving stored at the archival system. When archiving has been initiated, the archival system obtains a user profile 202 which has been stored at the archival system for a user.

In addition to the information described with respect to the preferred embodiment, the user profile stored at the archival system may also contain information specifying criteria used to determine whether a message should be archived. For example, the criteria used to determine whether a message should be archived may include, age of message, length of message, identity of the user leaving the message, etc. When selective archiving is performed, the archival system uses speech recognition capabilities to recognize certain words provided by the voice mail system prompts, for example, the date of a message, to determine whether the message should be selectively archived based on the specified criteria. However, it is preferable to archive all messages stored in the voice mail machine at one time. When all messages are archived, the speech recognition capabilities of the archival system are not necessary since there is no need to selectively determine a message to be archived. It is noted that the steps of initiating 200 archiving and obtaining 202 the user profile may be performed in one step if the user profile contains the user-configured schedule of archiving.

After the archival system determines which messages are to be archived, a recording device is selected and power is supplied to the recording device 204 in a manner similar to that described above with respect to the preferred embodiment. A selected recording medium is mounted, either automatically by an automated device or by an operator, in the recording device. The automated device or the operator provide an acknowledgment (ACK) indicating that the recording device is mounted which is received 206 by the archival system. When the acknowledgment is received, the archival system then makes a call 208 to the voice mail system by, e.g., outdialing over the PSTN or by "connecting" via Internet, and initiates a login sequence 210 to the user's mailbox in the voice mail system, as if it were a subscriber. To log in to the user's mailbox, the archival a system automatically goes off hook and generates DTMF signals to dial the voice mail machine using, e.g., the same equipment and similar method described above for establishing a communication link by the voice mail system 10 to the archival system. Once the archival system has logged in to the user's mailbox, the archival system initiates a "play messages" sequence 212 during which the archival system asks the voice mail system 10 to play the messages stored in the user's mailbox. The archival system records 214 until a silence of, e.g., three seconds is detected, and upon detection of the required period of silence the archival system stops recording. If the deletion handling method is set to DELETE-IMMEDIATELY or DELETE-AFTER-TRANSFER, then the archival system sends a DELETE and a command to play the next message 216 is issued to the voice mail system 10. Otherwise, the message is saved and a command to play the next message 216 is issued to the voice mail system 10.

The archival system retrieves the message directly from the voice mail system 10 and the message is transferred to the archival system. The message may be stored in a queue at the archival system, however, it is not necessary to store the message in a queue, and the message may be directly stored in the archival storage medium. The message is recorded to the selected archival storage medium and a command to play the next message is issued 216 to the voice mail system 10. The archival system then determines if all messages have been extracted from the voice mail system 218. Steps 214–218 are performed until the number of messages requested by the user has been extracted and it is determined in step 218 that no more messages remain to be recorded. If the archival system has voice recognition capability, the archival system can extract voice mail messages until the voice mail system 10 prompt phrase, e.g., "end of messages" or "there are no more messages" is recognized.

If there are no more messages to be recorded, the archival system logs out of the voice mail system 220 by generating a DTMF code or by going off-line. An instruction to dismount the archival medium 222 is issued by the archival system to the operator or the automated device, and an acknowledgement (ACK) is provided to the archival system indicating that the archival storage medium has been dismounted. When the archival system receives the acknowledgment that the archival storage medium has been dismounted, the power supply to the recording device is turned off 224 and the archival system waits until another archiving operation is initiated 200.

As described above, it is preferable that all of the user's messages are played and archived. However, the archival system may use voice recognition to "query" the voice mail system 10 using a defined protocol to selectively store voice mail messages based on predefined criteria, e.g., how long each message has resided in the voice mail system, or whether the message meets the other predefined criteria. The protocol may involve, for example, generating a DTMF code to play the user's message(s) to get date/time information from the message timestamp. If the message meets specified age criteria the archival system goes into a record mode until silence or a specific voice mail system voice prompt is detected using the voice recognition capabilities.

Since archiving may be done using conventional operation of the voice mail service system 10, the message is directly retrieved from the voice mail system and is not stored in a transfer queue at the voice mail system. The archiving process is automatically repeated periodically depending on the frequency defined by the user-configured schedule of archiving to provide the archive service subscriber with a record of phone messages or the archiving may be initiated by the user on demand.

Although the present invention has been described above with respect to an integrated services platform including voice mail capabilities, the present invention is also applicable to voice mail systems which are implemented co-resident on general purpose computers. Further, answering machines could implement the archival protocol of the present invention allowing answering machine messages to be played as well.

The present invention advantageously allows selected voice mail messages to be saved and a permanent record of these messages to be kept. This feature is useful, for example, in a business organization which would benefit from an audit trail or permanent record of messages. Such business organizations may include stockbrokers, doctors, lawyers and certain government agencies. Additionally, the invention may be used by relatives and friends to provide recorded messages to each other. For example, grandparents could easily and conveniently receive a cassette tape or CD containing a message or multiple messages from their grandchildren.

The many features and advantages of the present invention are apparent from the detailed specification, and thus it is intended by the appended claims to cover all such features and advantages of the system which fall within the true spirit and scope of the invention. Further, numerous modifications and changes will readily occur to those skilled in the art from the disclosure of this invention; thus, it is not desired to limit the invention to the exact construction and operation illustrated and described. Accordingly, suitable modifications and equivalents may be resorted to as falling within the scope and spirit of the invention.

What is claimed is:

1. A method of producing archival recordings of voice mail messages, comprising the steps of:
   (a) obtaining a request from a user via a telephone interface to reproduce a voice mail message;
   (b) retrieving the voice mail message:
   (c) transferring the voice mail message to a recording device, other than that used to record the voice mail message, available to record messages for a plurality of voice mail users; and
   (d) recording the voice mail message on a removable storage medium for storing messages only for the user, and further comprising the following steps performed between steps (a) and (b):
   (e) initiating archival processing in response to selection of an archive option;
   (f) obtaining profile information on the user; and
   (g) identifying the voice mail message stored for the user.

2. A method as recited in claim 1, wherein said retrieving in step (b) comprises the step of accessing the voice mail message identified in step (g).

3. A method as recited in claim 2,
   further comprising the step of (h) selecting a preferred storage medium,
   wherein said transferring in step (c) comprises the step of storing the voice mail message in a storage queue, and
   wherein said recording in step (d) comprises the steps of:
      (d1) selecting a recording device and automatically supplying power to the recording device selected;
      (d2) instructing mounting of the preferred storage medium on the recording device selected in step (d1);
      (d3) verifying mounting of the preferred storage medium on the recording device selected in step (d1); and
      (d4) storing the voice mail message on the preferred storage medium.

4. A method as recited in claim 3, further comprising the step of (h) selecting the removable storage medium from a plurality of removable storage media.

5. A method as recited in claim 4,
   further comprising the steps of;
   storing a user preferred storage medium in the profile information, prior to performing step (e), and
   wherein said selecting in step (h) is performed automatically in dependence upon the profile information obtained in step (f).

6. A method as recited in claim 4, wherein said selecting in step (h) comprises the steps of:
   (h1) prompting the user for selection of the removable storage medium; and
   (h2) receiving a response from the user identifying the removable storage medium.

7. A method as recited in claim 3,
wherein said retrieving in step (b) is performed by a voice mail system,
further comprising the step of (h) selecting an archival system for performing step (d), and
wherein said transferring in step (c) transfers the voice mail message from the voice mail system to the archival system selected in step (h).

8. A method as recited in claim 7,
further comprising the step of (i) storing a user preferred archival system in the profile information on the voice mail system, prior to performing step (e), and
wherein said selecting in step (h) is performed automatically in dependence upon the profile information stored in step (i).

9. A method as recited in claim 7, wherein said selecting in step (h) comprises the steps of:
(h1) prompting the user for selection of the archival system; and
(h2) receiving a response from the user identifying the archival system.

10. A method as recited in claim 7, wherein said transferring in step (c) comprises the steps of:
(c1) outdialing to the archival system selected in step (h);
(c2) establishing a connection with the archival system;
(c3) passing user information in the profile information from the voice messaging system to the archival system; and
(c4) communicating between the voice mail system and the archival system to transfer the voice mail message.

11. A method as recited in claim 7, further comprising the step of (i) queuing the voice mail message retrieved in step (b) in a transfer queue with other messages, and
wherein said transferring in step (c) transfers all messages from the transfer queue to the archival system selected in step (h).

12. A method as recited in claim 7, wherein said selecting in step (h) comprises selecting an archival system from a plurality of archival systems.

13. A method of producing archival recordings of voice mail messages, comprising the steps of:
(a) obtaining a request from a user via a telephone interface to reproduce a voice mail message;
(b) retrieving the voice mail message;
(c) transferring the voice mail message to a recording device, other than that used to record the voice mail message, available to record messages for a plurality of voice mail users,
(d) recording the voice mail message on a removable storage medium for storing messages only for the user;
(e) transferring message identifying information with the voice mail message transferred in step (c); and
(f) recording the message identifying information with the voice mail message recorded in step (d).

14. A method as recited in claim 13, further comprising the steps of:
(g) retrieving, as part of the message identifying information, message identification data automatically stored by the voice mail system, when the voice mail message is retrieved in step (b);
(h) prompting a user for a header in response to selection of the voice mail message for archiving; and
(i) storing the header as part of the message identifying information when the user creates the header in response to said prompting in step (h).

15. A method of producing archival recordings of voice mail messages, comprising the steps of:
(a) obtaining a request from a user via a telephone interface to reproduce a voice mail message;
(b) retrieving the voice mail message;
(c) transferring the voice mail message to a recording device, other than that used to record the voice mail message, available to record messages for a plurality of voice mail users;
(d) recording the voice mail message on a removable storage medium for storing messages only for the user;
(e) verifying accuracy of said recording in step (d); and
(f) indicating that the voice mail message retrieved in step (b) may be deleted when said verifying in step (e) determines that said recording in step (d) was accurate.

16. A method as recited in claim 15, further comprising the steps of:
(g) obtaining, prior to said retrieving in step (b), a request from a user for said recording in step (d); and
(h) obtaining instructions from the user whether to delete, upon said indicating in step (f), the voice mail message retrieved in step (b).

17. A method as recited in claim 16, further comprising the steps of:
(i) deleting the voice mail message retrieved in step (b) upon said indicating in step (f) when said obtaining in step (g) indicates that said deleting should occur upon successful verification in step (e);
(j) receiving instructions from the user to delete the voice mail message retrieved in step (b) when said obtaining in step (h) indicates that said deleting in step (i) should not occur upon successful verification in step (e); and
(k) deleting the voice mail message retrieved in step (b) when the user requests deletion in step (j).

18. An apparatus for producing archival recordings, comprising:
communication means for receiving voice mail messages and message identifying information;
a processing system, operatively connected to said communication means, to control operation of said apparatus;
recording devices, operatively connected to said processing system, to record the voice mail messages on a removable storage medium; and
an interface, operatively connected to said processing system, to instruct handling of the removable storage media in accordance with the message identifying information.

19. An apparatus as recited in claim 18, wherein said interface comprises an operator interface, operatively connected to said processing system, to communicate with at least one operator for handling of the removable storage media in accordance with the message identifying information.

20. An apparatus as recited in claim 19,
wherein said communication means comprises interprocessor communication means for receiving from a plurality of voice mail systems, the voice mail messages and the message identifying information, including an archive requester, a preferred storage medium and archived message handling instructions, and
wherein said operator interface instructs the at least one operator to mount the preferred storage medium on a specified recording device, receives indications of successful mounting and completion of recording and supplies dismounting instructions and the archived message handling instructions.

21. An apparatus as recited in claim 20, wherein said interprocessor communication means comprises a multiport telephone system interface card operatively connected to said processing system, and wherein said apparatus further comprises a power supply control card, operatively connected to said processing system and said recording devices, to supply power only to the specified recording device for mounting, recording and dismounting operations.

22. A method of producing archival recordings of voice mail messages, comprising the steps of:

obtaining a request from a user to reproduce a voice mail message;

retrieving the voice mail message;

transferring the voice mail message to a recording device capable of recording voice mail messages from a plurality of users simultaneously, other than that used to record the voice mail message; and recording the voice mail message on a removable storage medium for recording messages only for the user.

23. A method of producing archival recordings of voice mail messages, comprising the steps of:

(a) obtaining a request from a user via a telephone interface to reproduce a voice mail message;

(b) initiating archival processing in response to selection of an archive option;

(c) obtaining profile information on the user;

(d) identifying the voice mail message stored for the user;

(e) retrieving the voice mail message;

(f) transferring the voice mail message to a recording device other than that used to record the voice mail message;

(g) recording the voice mail message on a removable storage medium available to record messages for a plurality of voice mail users;

(h) selecting the removable storage medium from a plurality of removable storage media; and storing a user preferred storage medium in the profile information, prior to performing step (b), wherein said retrieving in step (e) comprises the step of accessing the voice mail message identified in step (d), and wherein said selecting in step (h) is performed automatically in dependence upon the profile information obtained in step (c).

24. A method of producing archival recordings of voice mail messages, comprising the steps of:

(a) obtaining a request from a user to reproduce a voice mail message;

(b) initiating archival processing in response to selection of an archive option;

(c) obtaining profile information on the user;

(d) identifying the voice mail message stored for the user;

(e) retrieving the voice mail message;

(f) transferring the voice mail message to a recording device other than that used to record the voice mail message;

(g) recording the voice mail message on a removable storage medium available to record messages for a plurality of voice mail users;

(h) selecting an archival system for performing step (g); and (i) storing a user preferred archival system in the profile information on the voice mail system, prior to performing step (b), wherein said retrieving in step (e) is performed by a voice mail system and comprises the step of accessing the voice mail message identified in step (d), wherein said transferring in step (f) transfers the voice mail message from the voice mail system to the archival system selected in step (h), and wherein said selecting in step (h) is performed automatically in dependence upon the profile information stored in step (i).

25. A method of producing archival recordings of voice mail messages, comprising the steps of:

(a) obtaining a request from a user to reproduce a voice mail message;

(b) initiating archival processing in response to selection of an archive option;

(c) obtaining profile information on the user;

(d) identifying the voice mail message stored for the user;

(e) retrieving the voice mail message;

(f) transferring the voice mail message to a recording device other than that used to record the voice mail message;

(g) recording the voice mail message on a removable storage medium available to record messages for a plurality of voice mail users; and (h) selecting a preferred storage medium, wherein said retrieving in step (e) comprises the step of accessing the voice mail message identified in step (d), wherein said transferring in step (f) comprises the step of storing the voice mail message in a storage queue, and wherein said recording in step (g) comprises the steps of (g1) selecting a recording device and automatically supplying power to the recording device selected;

(g2) instructing mounting of the preferred storage medium on the recording device selected in step (g1);

(g3) verifying mounting of the preferred storage medium on the recording device selected in step (g1); and (g4) storing the voice mail message on the preferred storage medium.

26. A method of producing archival recordings of voice mail messages, comprising the steps of:

(a) obtaining a request from a user to reproduce a voice mail message;

(b) retrieving the voice mail message;

(c) transferring the voice mail message to a recording device other than that used to record the voice mail message;

(d) recording the voice mail message on a removable storage medium available to record messages for a plurality of voice mail users;

(e) transferring message identifying information with the voice mail message transferred in step (c);

(f) recording the message identifying information with the voice mail message recorded in step (d);

(g) retrieving, as part of the message identifying information, message identification data automatically stored by the voice mail system, when the voice mail message is retrieved in step (b);

(h) prompting a user for a header in response to selection of the voice mail message for archiving; and (i) storing the header as part of the message identifying information when the user creates the header in response to said prompting in step (h).

27. A method of producing archival recordings of voice mail messages, comprising the steps of:

(a) obtaining a request from a user to reproduce a voice mail message;

(b) retrieving the voice mail message;

(c) transferring the voice mail message to a recording device other than that used to record the voice mail message;

(d) recording the voice mail message on a removable storage medium available to record messages for a plurality of voice mail users;

(e) verifying accuracy of said recording in step (d); and (f) indicating that the voice mail message retrieved in step (b) may be deleted when said verifying in step (e) determines that said recording in step (d) was accurate.

28. A method as recited in claim 27, further comprising the steps of:

(g) obtaining, prior to said retrieving in step (b), a request from a user for said recording in step (d); and (h) obtaining instructions from the user whether to delete, upon said indicating in step (f), the voice mail message retrieved in step (b).

29. A method as recited in claim 28, further comprising the steps of:

(i) deleting the voice mail message retrieved in step (b) upon said indicating in step (f) when said obtaining in step (g) indicates that said deleting should occur upon successful verification in step (e);

(j) receiving instructions from the user to delete the voice mail message retrieved in step (b) when said obtaining in step (h) indicates that said deleting in step (i) should not occur upon successful verification in step (e); and (k) deleting the voice mail message retrieved in step (b) when the user requests deletion in step (j).

30. A method of producing archival recordings of voice mail messages, comprising the steps of:

(a) receiving a request from an archiving device to reproduce a voice mail message;

(b) retrieving the voice mail message;

(c) transferring the voice mail message to a recording device; and (d) recording the voice mail message on a removable storage medium, wherein said receiving in step (a) comprises the steps of:
(a1) accessing profile information of a user stored at the archival device; and
(a2) identifying criteria used to determine whether the voice mail message is to be archived from the profile information.

31. A method of producing archival recordings of voice mail messages, comprising the steps of:

(a) receiving a request from an archiving device to reproduce a voice mail message;

(b) retrieving the voice mail message;

(c) transferring the voice mail message to a recording device; and (d) recording the voice mail message on a removable storage medium, wherein said receiving in step (a) comprises the steps of
(a1) accessing profile information of a user stored at the archival device; and
(a2) identifying criteria used to determine whether the voice mail message is to be archived from the profile information, and wherein said retrieving in step (b) comprises the steps of
(b1) logging in to a voice mail system;
(b2) querying the voice mail system for a voice mail message meeting the criteria identified in step (a2); and
(b3) accessing the voice mail message meeting the criteria identified in step (a2).

32. A method as recited in claim 31, wherein said transferring step (c) comprises the step of transferring the voice mail message accessed in step (b3) from the voice mail system to the archival system.

33. A method as recited in claim 31, wherein said recording step (d) comprises the steps of:

(d1) selecting a recording device and automatically supplying power to the recording device selected;

(d2) instructing mounting of the preferred storage medium on the recording device selected in step (d1);

(d3) verifying mounting of the preferred storage medium on the recording device selected in step (d1); and (d4) storing the voice mail message on the preferred storage medium.

34. A method of producing archival recordings of voice mail messages, comprising the steps of:

(a) obtaining a request from a user to reproduce a voice mail message;

(b) initiating archival processing in response to selection of an archive option;

(c) obtaining profile information on a user;

(d) identifying the voice mail message stored for the user;

(e) retrieving the voice mail message;

(f) transferring the voice mail message to a recording device, other than that used to record the voice mail message, available to record messages for a plurality of voice mail users; and (g) recording the voice mail message on a removable storage medium for storing messages only for the user.

35. A method as recited in claim 34, wherein said retrieving in step (e) comprises the step of accessing the voice mail message identified in step (d).

36. A method as recited in claim 35, further comprising the step of (h) selecting a preferred storage medium, wherein said transferring in step (f) comprises the step of storing the voice mail message in a storage queue, and wherein said recording in step (g) comprises the steps of:
(g1) selecting a recording device and automatically supplying power to the recording device selected;
(g2) instructing mounting of the preferred storage medium on the recording device selected in step (g1);
(g3) verifying mounting of the preferred storage medium on the recording device selected in step (g1); and
(g4) storing the voice mail message on the preferred storage medium.

37. A method as recited in claim 35, wherein said retrieving in step (e) is performed by a voice mail system, further comprising the step of (h) selecting an archival system for performing step (g), and wherein said transferring in step (f) transfers the voice mail message from the voice mail system to the archival system selected in step (h).

38. A method as recited in claim 37, further comprising the step of (i) storing a user preferred archival system in the profile information on the voice mail system, prior to performing step (b), and wherein said selecting in step (h) is performed automatically in dependence upon the profile information stored in step (i).

39. A method as recited in claim 37, wherein said selecting in step (h) comprises the steps of:

(h1) prompting the user for selection of the archival system; and (h2) receiving a response from the user identifying the archival system.

40. A method as recited in claim 37, wherein said transferring in step (f) comprises the steps of:

(f1) outdialing to the archival system selected in step (h);

(f2) establishing a connection with the archival system;

(f3) passing user information in the profile information from the voice messaging system to the archival system; and (f4) communicating between the voice mail system and the archival system to transfer the voice mail message.

41. A method as recited in claim 37, further comprising the step of (i) queuing the voice mail message retrieved in step (e) in a transfer queue with other messages, and wherein said transferring in step (f) transfers all messages from the transfer queue to the archival system selected in step (h).

42. A method as recited in claim 37, wherein said selecting in step (h) comprises selecting an archival system from a plurality of archival systems.

43. A method as recited in claim 35, further comprising the step of (h) selecting the removable storage medium from a plurality of removable storage media.

44. A method as recited in claim 43, further comprising the step of:

storing a user preferred storage medium in the profile information, prior to performing step (b), and wherein said selecting in step (h) is performed automatically in dependence upon the profile information obtained in step (c).

45. A method as recited in claim 43, wherein said selecting in step (h) comprises the steps of:

(h1) prompting the user for selection of the removable storage medium; and (h2) receiving a response from the user identifying the removable storage medium.

46. A method of producing archival recordings of voice mail messages, comprising the steps of:

(a) obtaining a request from a user to reproduce a voice mail message;

(b) retrieving the voice mail message;

(c) transferring the voice mail message to a recording device, other than that used to record the voice mail message, available to record messages for a plurality of voice mail users;

(d) recording the voice mail message on a removable storage medium for storing messages only for the user;

(e) transferring message identifying information with the voice mail message transferred in step (c); and (f) recording the message identifying information with the voice mail message recorded in step (d).

47. A method as recited in claim 46, further comprising the steps of:

(g) retrieving, as part of the message identifying information, message identification data automatically stored by the voice mail system, when the voice mail message is retrieved in step (b);

(h) prompting a user for a header in response to selection of the voice mail message for archiving; and (i) storing the header as part of the message identifying information when the user creates the header in response to said prompting in step (h).

48. A method of producing archival recordings of voice mail messages, comprising the steps of:

(a) obtaining a request from a user to reproduce a voice mail message;

(b) retrieving the voice mail message;

(c) transferring the voice mail message to a recording device, other than that used to record the voice mail message, available to record messages for a plurality of voice mail users;

(d) recording the voice mail message on a removable storage medium for storing messages only for the user;

(e) verifying accuracy of said recording in step (d); and (f) indicating that the voice mail message retrieved in step (b) may be deleted when said verifying in step (e) determines that said recording in step (d) was accurate.

49. A method as recited in claim 48, further comprising the steps of:

(g) obtaining, prior to said retrieving in step (b), a request from a user for said recording in step (d); and (h) obtaining instructions from the user whether to delete, upon said indicating in step (f), the voice mail message retrieved in step (b).

50. A method as recited in claim 49, further comprising the steps of:

(i) deleting the voice mail message retrieved in step (b) upon said indicating in step (f) when said obtaining in step (g) indicates that said deleting should occur upon successful verification in step (e);

(j) receiving instructions from the user to delete the voice mail message retrieved in step (b) when said obtaining in step (h) indicates that said deleting in step (i) should not occur upon successful verification in step (e); and (k) deleting the voice mail message retrieved in step (b) when the user requests deletion in step (j).

51. A method of producing archival recordings of voice mail messages, comprising the steps of:

(a) receiving a request from an archiving device to reproduce a voice mail message, including (a1) accessing profile information of a user stored at the archival device, and (a2) identifying criteria used to determine whether the voice mail message is to be archived from the profile information;

(b) retrieving the voice mail message;

(c) transferring the voice mail message to a recording device; and (d) recording the voice mail message on a removable storage medium for storing messages only for an individual user.

52. A method as recited in claim 51, wherein said retrieving in step (b) comprises the steps of:

(b1) logging in to a voice mail system;

(b2) querying the voice mail system for a voice mail message meeting the criteria identified in step (a2); and (b3) accessing the voice mail message meeting the criteria identified in step (a2).

53. A method as recited in claim 52, wherein said transferring step (c) comprises the step of transferring the voice mail message accessed in step (b3) from the voice mail system to the archival system.

54. A method as recited in claim 52, wherein said recording step (d) comprises the steps of:

(d1) selecting a recording device and automatically supplying power to the recording device selected;

(d2) instructing mounting of the preferred storage medium on the recording device selected in step (d1);

(d3) verifying mounting of the preferred storage medium on the recording device selected in step (d1); and (d4) storing the voice mail message on the preferred storage medium.

55. A method of producing archival recordings of voice mail messages, comprising the steps of:

(a) receiving a request from an archiving device to reproduce a voice mail message;

(b) retrieving the voice mail message, including (b1) logging in to a voice mail system, (b2) querying the voice mail system for the voice mail message, and (b3) accessing the voice mail message;

(c) transferring the voice mail message to a recording device; and (d) recording the voice mail message on a removable storage medium for storing messages only for an individual user, including (d1) selecting a recording device and automatically supplying power to the recording device selected, (d2) instructing mounting of the preferred storage medium on the recording device selected in step (d1), (d3) verifying mounting of the preferred storage medium on the recording device selected in step (d1), and (d4) storing the voice mail message on the preferred storage medium.

56. A method of producing archival recordings of voice mail messages, comprising the steps of:

(a) obtaining a request from a user to reproduce a voice mail message;

(b) storing a user preferred storage medium in profile information on the user;

(c) initiating archival processing in response to selection of an archive option;

(d) obtaining profile information on the user;

(e) identifying the voice mail message stored for the user;

(f) retrieving the voice mail message by accessing the voice mail message identified in step (e);

(g) transferring the voice mail message to a recording device other than that used to record the voice mail message;

(h) recording the voice mail message on a removable storage medium available to record messages for a plurality of voice mail users; and (i) automatically selecting the removable storage medium from a plurality of removable storage media in dependence upon the profile information obtained in step (d).

57. A method of producing archival recordings of voice mail messages, comprising the steps of:

(a) receiving a request from an archiving device to reproduce a voice mail message;

(b) retrieving the voice mail message, including (b1) logging in to a voice mail system, (b2) querying the voice mail system for the voice mail message, and (b3) accessing the voice mail message;

(c) transferring the voice mail message to a recording device; and (d) recording the voice mail message on a removable storage medium, including (d1) selecting a recording device and automatically supplying power to the recording device selected, (d2) instructing mounting of the preferred storage medium on the recording device selected in step (d1), (d3) verifying mounting of the preferred storage medium on the recording device selected in step (d1), and (d4) storing the voice mail message on the preferred storage medium.

\* \* \* \* \*